US 8,077,624 B2

(12) United States Patent
Capone et al.

(10) Patent No.: US 8,077,624 B2
(45) Date of Patent: *Dec. 13, 2011

(54) METHOD AND SYSTEM FOR OUT-OF-BAND SIGNALING FOR TCP CONNECTION SETUP

(75) Inventors: Jeffery M. Capone, Tempe, AZ (US); Pramod Immaneni, Phoenix, AZ (US)

(73) Assignee: NETGEAR, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/643,731

(22) Filed: Dec. 21, 2009

(65) Prior Publication Data

US 2010/0153561 A1 Jun. 17, 2010

Related U.S. Application Data

(63) Continuation of application No. 11/260,922, filed on Oct. 27, 2005, now Pat. No. 7,710,995.

(60) Provisional application No. 60/659,556, filed on Mar. 8, 2005.

(51) Int. Cl.
*H04L 12/26* (2006.01)
*H04L 12/28* (2006.01)
*G06F 15/16* (2006.01)
*H04J 3/00* (2006.01)

(52) U.S. Cl. ......... 370/241; 709/227; 370/389; 370/521

(58) Field of Classification Search .................. None
See application file for complete search history.

(56) References Cited

U.S. PATENT DOCUMENTS

| 6,003,084 | A | 12/1999 | Green et al. ............... 709/227 |
| 6,996,628 | B2 | 2/2006 | Keane et al. ............... 709/238 |
| 2002/0010783 | A1 | 1/2002 | Primak et al. ............. 709/228 |
| 2002/0186683 | A1 | 12/2002 | Buck et al. |
| 2003/0018912 | A1 | 1/2003 | Boyle et al. |
| 2005/0044250 | A1 | 2/2005 | Gay et al. |
| 2005/0135250 | A1 | 6/2005 | Singh et al. ............... 370/235 |
| 2006/0174021 | A1 * | 8/2006 | Osborne et al. ........... 709/230 |
| 2006/0198296 | A1 | 9/2006 | Majee et al. ............... 370/216 |
| 2007/0112962 | A1 | 5/2007 | Lewontin .................. 709/227 |

OTHER PUBLICATIONS

U.S. Appl. No. 60/659,556, Jeffrey M. Capone.
RFC 793: Transmission Control Protocol, Sep. 1981. <http://www.faqs.org/rfcs/rfc793.html>.

(Continued)

*Primary Examiner* — Gregory Sefcheck
*Assistant Examiner* — Otis L Thompson, Jr.
(74) *Attorney, Agent, or Firm* — Boyle Fredrickson, S.C.

(57) ABSTRACT

Embodiments of this invention improve TCP performance over unreliable links and allow TCP connections to be set up when otherwise not possible. Embodiments of this invention include the use of out-of-band signaling for TCP to synchronizing and establishing a connection between two TCP endpoints without modification to the TCP/IP protocol suite. Embodiments of this invention provide a system that creates a control channel to enable out-of-band signaling for TCP connection establishment between two TCP endpoints. In embodiments of this invention, the control channel used for the out-of-band signaling traffic between the TCP endpoints (or peers) is achieved using a system that consists of a signaling broker, an agent application, and a virtual network interface and capture module that together create control channel for the TCP signaling traffic. Embodiments of this invention include a protocol to execute out-of-band signaling for TCP.

3 Claims, 6 Drawing Sheets

OTHER PUBLICATIONS

Definition: Out-of-band Signaling, <http://www.atis.org/tg2k/_out-of-band_signaling.html>.

James Hall, Ian Pratt, Ian Leslie and Andrew Moore, "The Effect of Early Packet Loss on Web Page Download Times," PAM 2003, La Jolla CA., Apr. 2003.

Ekwall R. et al., "Robust TCP Connections for Fault Tolerant Computing", Proceedings of The Ninth International Conference on Parallel and Distributed Systems (ICPADS '02), Taiwan, China, Dec. 17, 2002, pp. 501-508, XP010628950, ISBN: 0-7695-1760-9, Figure 1, p. 503, left-hand column, paragraph 2.2—p. 505, left-hand column, line 5.

Ekwall et al., "Robust TCP Connections for Fault Tolerant Computing", Parallel and Distributed Systems, 2002. Proceedings. Ninth Internation Conference on Dec. 17-20, 2002, pp. 501-508.

UK Examination Report Under Section 18(3), Application No. GB0717345.3 dated Nov. 13, 2008.

Francis et al., Characterization and Measurement of TCP Traversal Through NATs and Firewalls, 2005, Internet Measurement Conference: Proceedings of the 5th ACM SIGCOMM conference on Internet Measurement, All Pages.

* cited by examiner

To Fig. 5B

METHOD AND SYSTEM FOR OUT-OF-BAND SIGNALING FOR TCP CONNECTION SETUP

CROSS-REFERENCE TO RELATED APPLICATION

This application is a continuation of U.S. patent application Ser. No. 11/260,922, filed with the USPTO on Oct. 27, 2005, now U.S. Pat. No. 7,710,995, which is a non-provisional application claiming priority from U.S. Provisional application No. 60/659,556 previously filed with the USPTO on Mar. 8, 2005 by the same inventor. The entirety of the prior applications is incorporated by reference herein.

BACKGROUND OF INVENTION

1. Field of Invention

Embodiments of this invention relate to the field of Internet Protocol (IP) networks, Transmission Control Protocol (TCP) and out-of-band signaling and peer-to-peer networking.

2. Discussion of Related Art

Transmission Control Protocol (TCP) is one of the main protocols in the Internet and TCP/IP networks. TCP is a connection-oriented protocol where the devices at the end points (i.e., peers) use a preliminary protocol to establish an end-to-end connection before any data is sent. Connection-oriented protocol service is sometimes called a "reliable" network service, because it guarantees that data will arrive in the proper sequence. The alternative to connection-oriented transmission is the connectionless approach, in which data is sent from one end point to another without prior arrangement, for example, user datagram protocol (UDP). A TCP connection contains three phases: connection establishment, data transfer and connection termination.

In the connection establishment (or call setup) phase of any connection-oriented protocol, control data is passed between the two endpoints to establish a connection or circuit. This control traffic (or signaling) may occur on the same channel used for data exchanged (in-band signaling) or done on a separate channel that is dedicated for the purpose (out-of-band signaling). The TCP protocol uses a Three Way Handshake protocol to synchronize and establish a connection between two TCP peers. In the connection establishment phase, the exchange of signaling (Three-way-handshaking) traffic is sent on same TCP connection (or channel) that is used for data transfer. While TCP uses in-band-signaling, most circuit switched communication use out-of-band signaling as specified in the Signaling System 7 (SS7) standards.

The TCP Three Way Handshake protocol between a client and server is shown in FIG. 1. A TCP connection is identified by the IP addresses and virtual port numbers used by both ends. During communication, additional numbers are used to keep track of the order or sequence number which indicates what order the segments of data should be reassembled. Finally, a maximum transmission size is constantly being negotiated via a fallback mechanism called windowing. The combination of port numbers, sequence numbers and window sizes constitutes a TCP connection and once these parameters have been negotiated between the TCP endpoints a TCP connection is established.

In the TCP/IP protocol suite, TCP 205 is the intermediate layer above IP 206 and below the application 204 as in FIG. 2. Applications send streams of 8-bit bytes to TCP for delivery through the network, and TCP divides the byte stream into appropriately sized segments. TCP then passes the resulting packets to IP for delivery through an Internet 202 to the TCP module 208 of the other endpoint 203. The TCP module 208 at the far end sends back an acknowledgement for bytes which have been successfully received; a timer at the sending TCP will cause a timeout if an acknowledgement is not received within a reasonable round trip time, and the (presumably lost) data will then be re-transmitted. The TCP checks that no bytes are damaged by using a checksum; one is computed at the sender for each block of data before it is sent, and checked at the receiver. Since each module has no knowledge of the function of the layer below or the layer above and since IP is a datagram network, IP packet that form the TCP connection may be received from different network interfaces.

In certain environments all or part of the TCP signaling traffic may be lost before reaching one or both TCP endpoints, leading to no connection establishment or slow page download times. Loss if signaling traffic may occur (but not limited to) when there is one or more firewalls present in the communication path between the TCP endpoints or when the TCP signaling traffic is traveling over unreliable wireless link. In the case of having firewalls present in the communication path, no connection is establishment since the firewalls typically bock all incoming TCP signaling traffic. In the case of having an unreliable link, the page download time can be hampered since a page download use parallel TCP connections to download the set of objects that comprise a page. The loss of TCP signaling traffic adversely impacts the total page download more than the loss of data packets since the delay to re-open a TCP connection is much greater than the retransmission delay for a data packet. This invention of out-of-band signaling for TCP connection setup can be used to improve performance over unreliable links and be used to set up and establish TCP connections when otherwise not possible.

Embodiments of this invention include the use of out-of-band signaling for synchronizing and establishing a connection between two TCP endpoints. Embodiments of this invention provide a system to enable out-of-band signaling for TCP synchronization and connection establishment between two TCP endpoints. In embodiments of this invention, the control channel used for the out-of-band signaling traffic between the TCP endpoints (or peers) is achieved using a system that consists of a signaling broker, an agent application, and a virtual network interface and capture module that together create control channel for the TCP signaling traffic.

SUMMARY OF OBJECTS OF THE INVENTION

Transmission control protocol (TCP) is a connection-oriented protocol were the devices at the end points (i.e., peers) use a preliminary protocol to establish an end-to-end connection before any data is sent. Connection-oriented protocol service is sometimes called a "reliable" network service, because it guarantees that data will arrive in the proper sequence. The alternative to connection-oriented transmission is the connectionless approach, in which data is sent from one end point to another without prior arrangement, for example, user datagram protocol (UDP).

In the connection establishment (or call setup) phase of any connection-oriented protocol, control data is passed between the two endpoints to establish a connection or circuit. This control traffic (or signaling) may occur on the same channel used for data exchanged (in-band signaling) or done on a separate channel that is dedicated for the purpose (out-of-band signaling). The TCP protocol uses a Three Way Handshake protocol to synchronize and establish a connection between two TCP peers. In the connection establishment phase, the exchange of signaling (Three-way-handshaking)

traffic is sent on same TCP connection (or channel) that is used for data transfer. While TCP uses in-band-signaling, most circuit switched communication use out-of-band signaling as specified in the Signaling System 7 (SS7) standards.

In certain environments all or part of the TCP signaling traffic may be lost before reaching one or both TCP endpoints, leading to no connection establishment or slow page download times. Loss of signaling traffic may occur (but not limited to) when there is one or more firewalls present in the communication path between the TCP endpoints or when the TCP signaling traffic is traveling over unreliable wireless link. In case of having firewalls present in the communication path, no connection is establishment since the firewalls typically bock all incoming TCP signaling traffic. In the case of having an unreliable link, the page download time can be hampered since a page download use parallel TCP connections to download the set of objects that comprise a page. The loss of TCP signaling traffic adversely impacts the total page download more than the loss of data packets since the delay to re-open a TCP connection is much greater than the retransmission delay for a data packet. This invention of out-of-band for TCP connection setup can be used to improve performance over unreliable links and used to set up TCP connections when otherwise not possible.

Embodiments of this invention include the use of out-of-band signaling for synchronizing and establishing a connection between two TCP endpoints. Embodiments of this invention provide a system to enable out-of-band signaling for TCP synchronization and connection establishment between two TCP endpoints. In embodiments of this invention, the control channel used for the out-of-band signaling traffic between the TCP endpoints (or peers) is achieved using a system that consists of a signaling broker, an agent application, and a virtual network interface and capture module that together create control channel for the TCP signaling traffic.

BRIEF DESCRIPTION OF THE DRAWINGS

The accompanying drawings, which are incorporated in and constitute a part of the specification, illustrate embodiments of the invention, and together with the general description given above and the detailed description of embodiments given below, serve to explain the principles of embodiments of this invention.

DETAILED DESCRIPTION OF INVENTION

In the following description of preferred embodiments, references are made to the accompanying drawings, which form a part hereof and in which are shown, by way of illustration, specific embodiments in which the invention may be practiced. It is to be understood that other embodiments may be utilized and structural changes may be made without departing from the scope of the preferred embodiments of the present invention.

Figure 1:
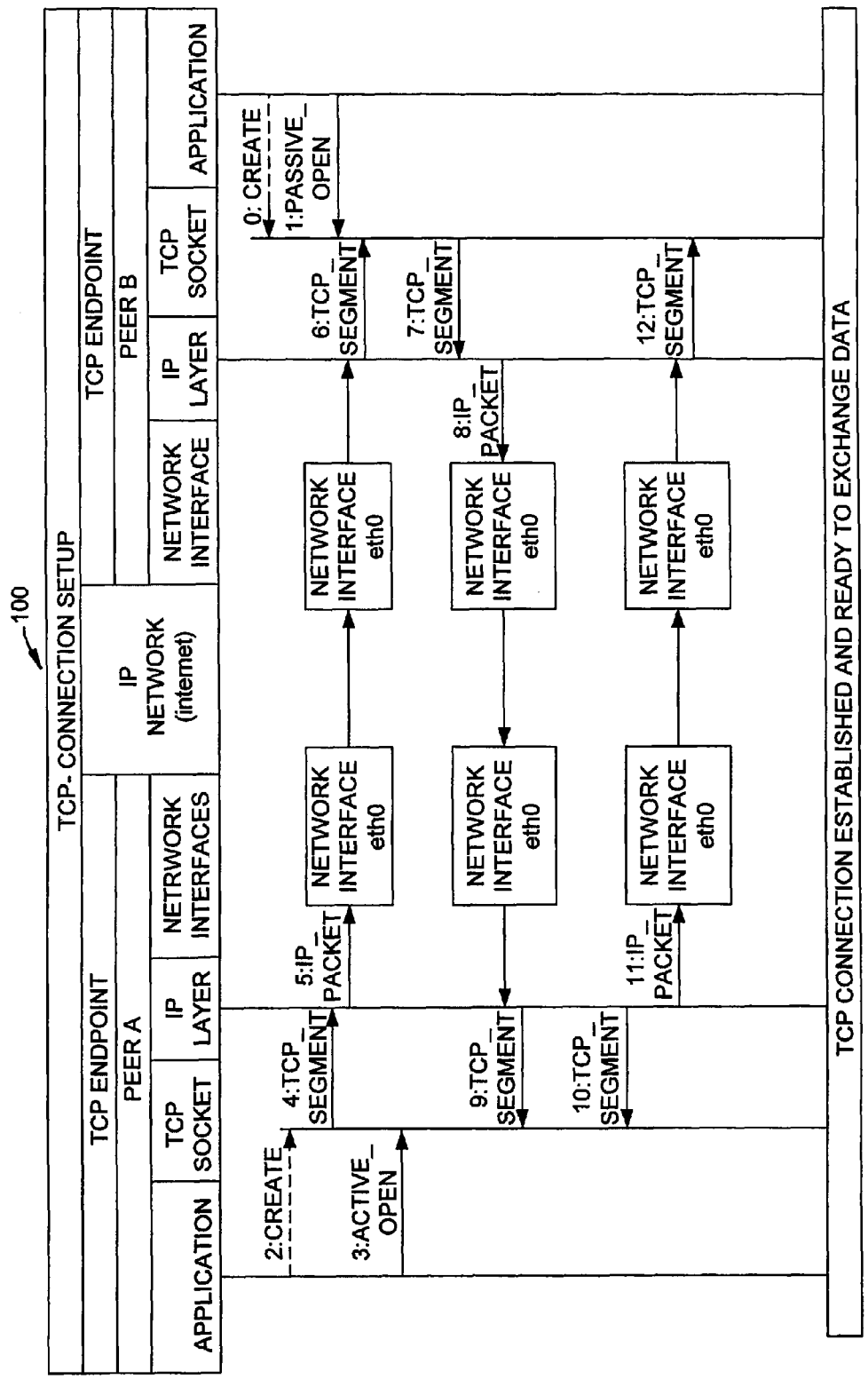
FIG. 1 shows the execution and flow of the TCP Three-way Handshaking protocol used to establish a connection between two TCP peers.
Figure 2:
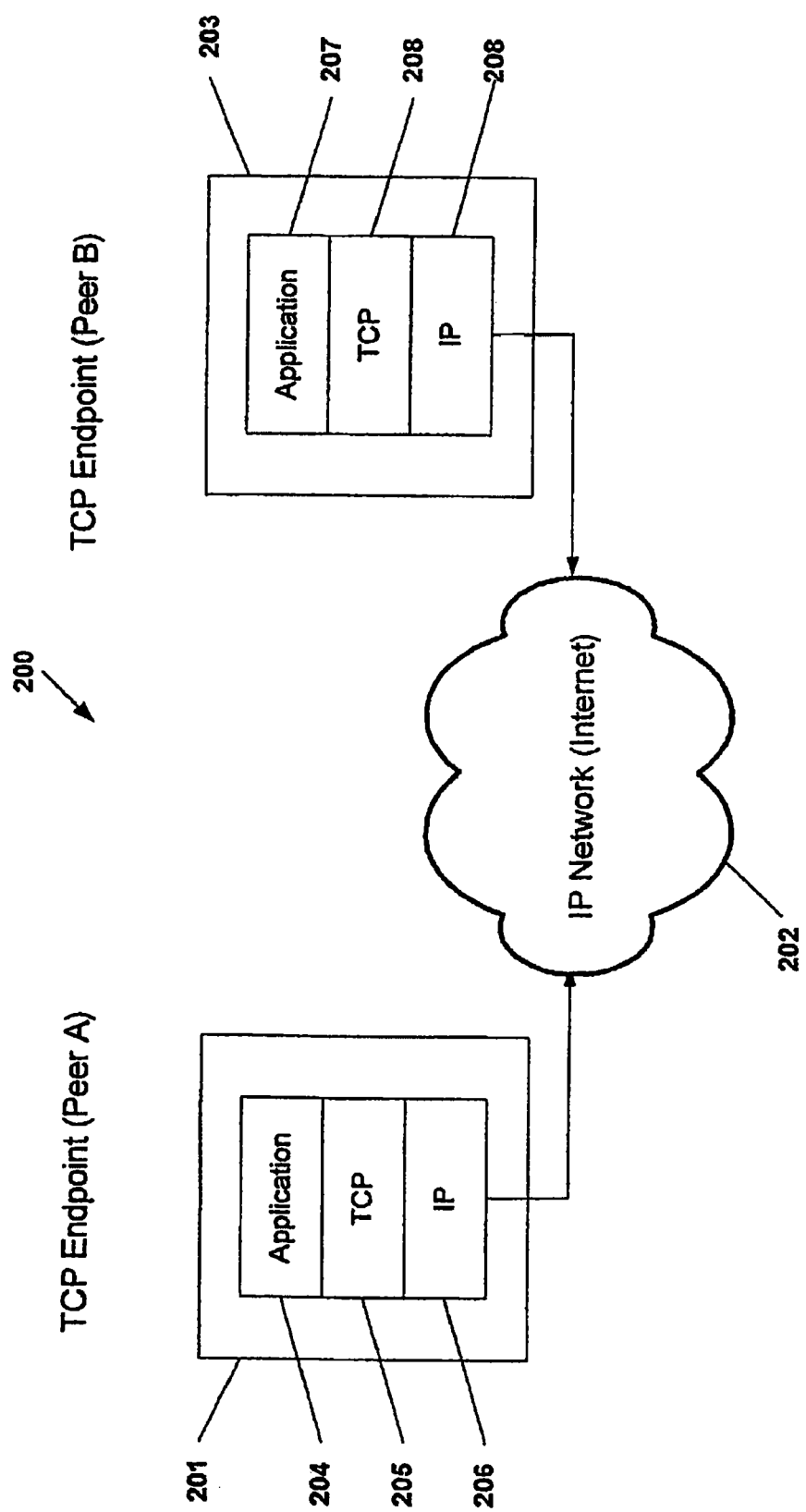
FIG. 2 shows the environment in which TCP is used across IP networks.

The physical environment 200 in which this invention may be applied is shown in FIG. 2. The environment consists of two TCP endpoints Peer A 201 and Peer B 203 connected by any IP network 203, which may be the Internet, and the like. Embodiments of this invention may also be applied if it is a private IP network, public IP network, a wireless IP network, or the Internet. Embodiments of this invention may also be applied if there are firewalls, gateways, proxies, routers, switches present in the communication path between Peer A 201 and Peer B 203. Embodiments of this invention may also be applied if Peer A 201 is the requestor and Peer B 203 is the requestee or if Peer B 203 is the requestor and Peer A 201 is the requestee.

Figure 3:
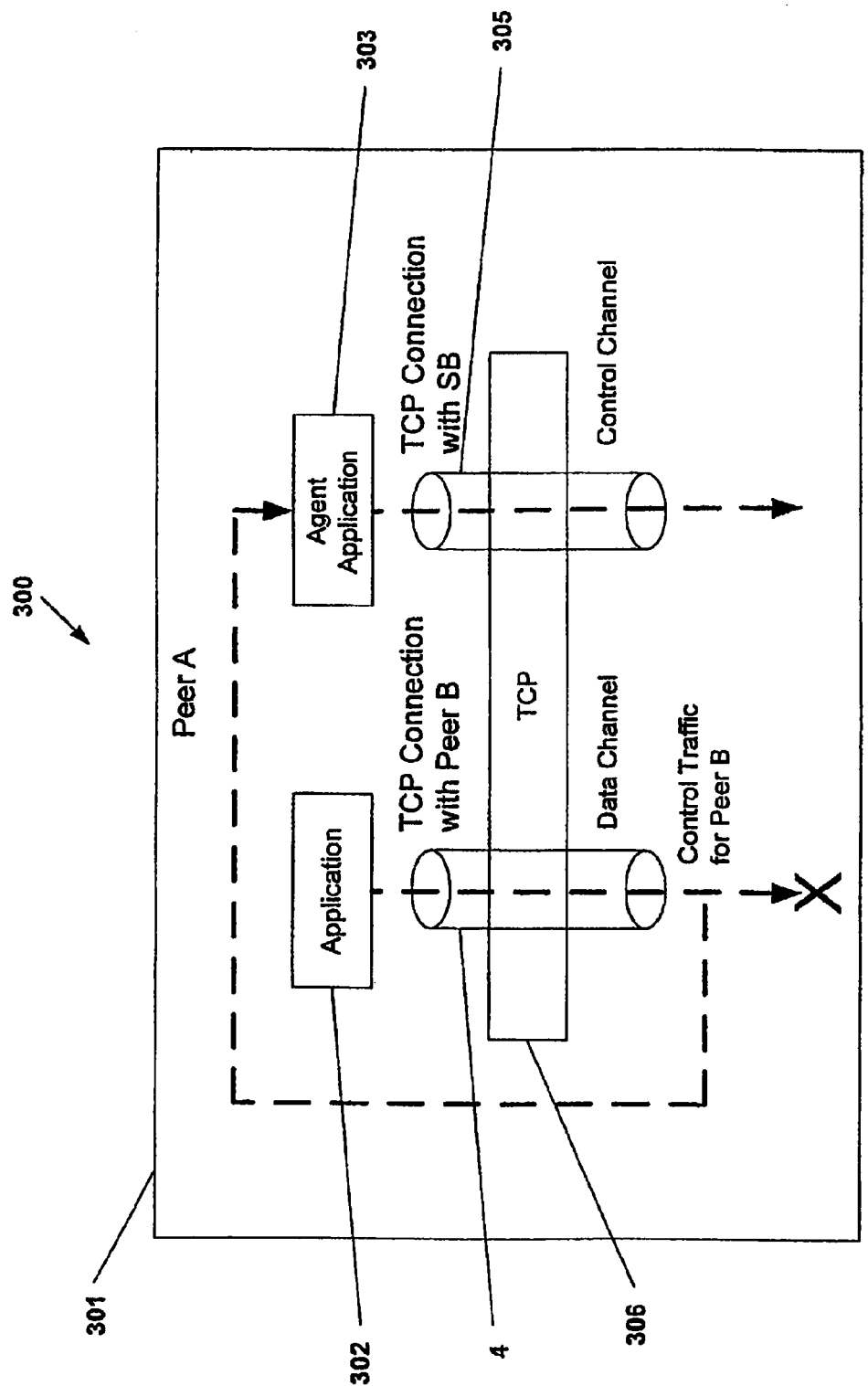
FIG. 3 shows how the control channel is used to send the TCP signaling traffic for out-of-band signaling for TCP.

Embodiments of this invention include the use of out-of-band signaling for TCP to synchronize and establish a connection between two TCP peers, for example as shown in FIG. 3. In this diagram 300 the application 302 in Peer A 301 opens a TCP connection 304 in the TCP module 306 for communication with Peer B. The TCP signaling traffic from this connection 304 is captured and passed to the agent application 303. The agent application 303 has already setup and established a TCP connection 305 with the signaling broker. Using this connection 305, the agent application 303 sends the TCP signaling traffic from the other TCP connection 304 to the signaling broker.

Figure 4:
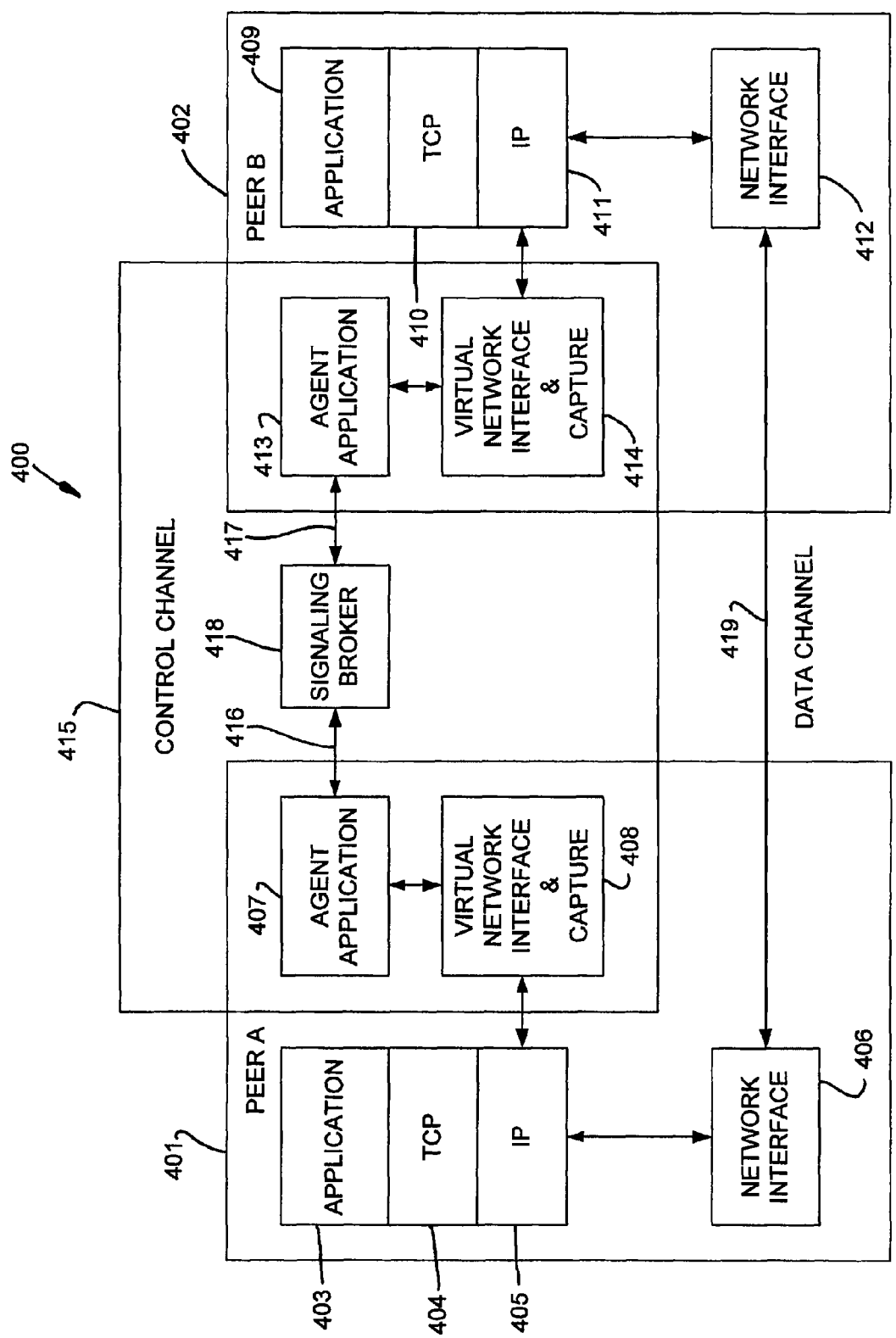
FIG. 4 depicts a system that may be used to create a control channel for sending TCP control traffic.

Embodiments of this invention include a system used to create a control channel for sending out-of-band TCP signaling traffic. The control channel 415 for TCP may be implemented with, but not limited to, a virtual network interface and packet capture module 408, an agent application 407 and a signaling broker 418, as shown in FIG. 4. In this diagram 400 Peer A 401 and Peer B 402 use embodiments of this invention to synchronize and establish a TCP connection. The application 403 opens a TCP connection in the TCP module 404 for communication with the TCP module 410 in Peer B 402. The IP module 405 receives TCP segments from the TCP module 404 and prepares IP packets and passes them to the physical network interface 406. The TCP control traffic from the connection in the TCP module 404 with Peer B 402 is passively captured by the virtual network interface and capture module 408 that passes the TCP signaling information to the agent application 407. The agent application 407 send the TCP signaling information to the signaling broker 418 using an establish TCP connection 416. The signaling broker 418 forwards this information to the application agent 413 in Peer B 402 using the established TCP connection 417 with Peer B. The application agent 413 passes the TCP signaling information to the virtual network interface and capture module 414 on Peer B that uses the information to reconstruct the IP packets containing the TCP signaling information and injects them into the IP module 411 in Peer B. The IP module 411 reconstructs the TCP segment and passes it up to TCP layer 410 in Peer B just as if they were received from the network interface 412 in Peer B 402. This control channel 415 is also be used for the reverse flow signaling traffic from Peer B 402 to Peer A 401.

Figure 5A:
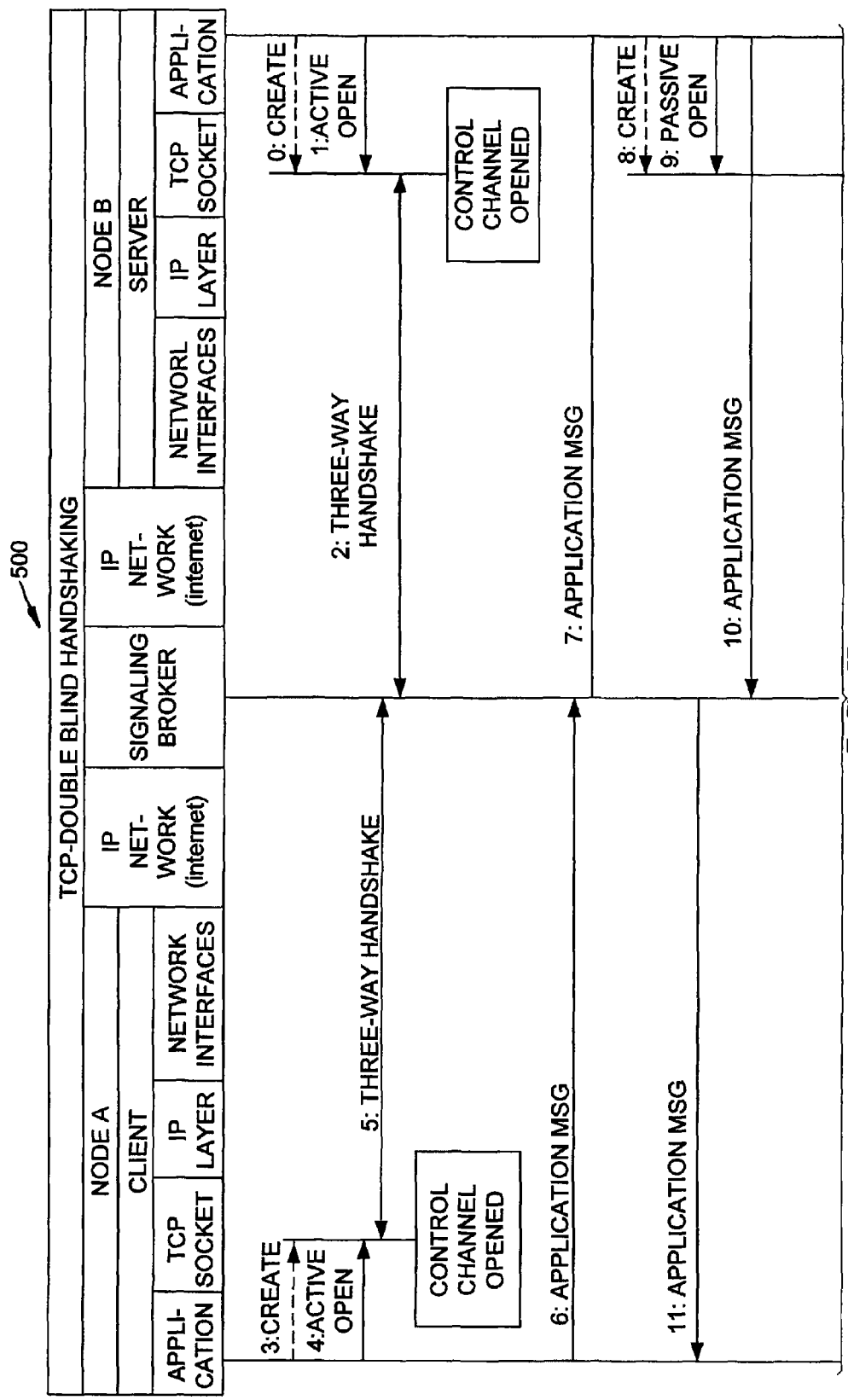
FIG. 5 demonstrates how the system in FIG. 4 can be used to execute out-of-band signaling for setting up and establishing a connection between two TCP endpoints.
Figure 5B:
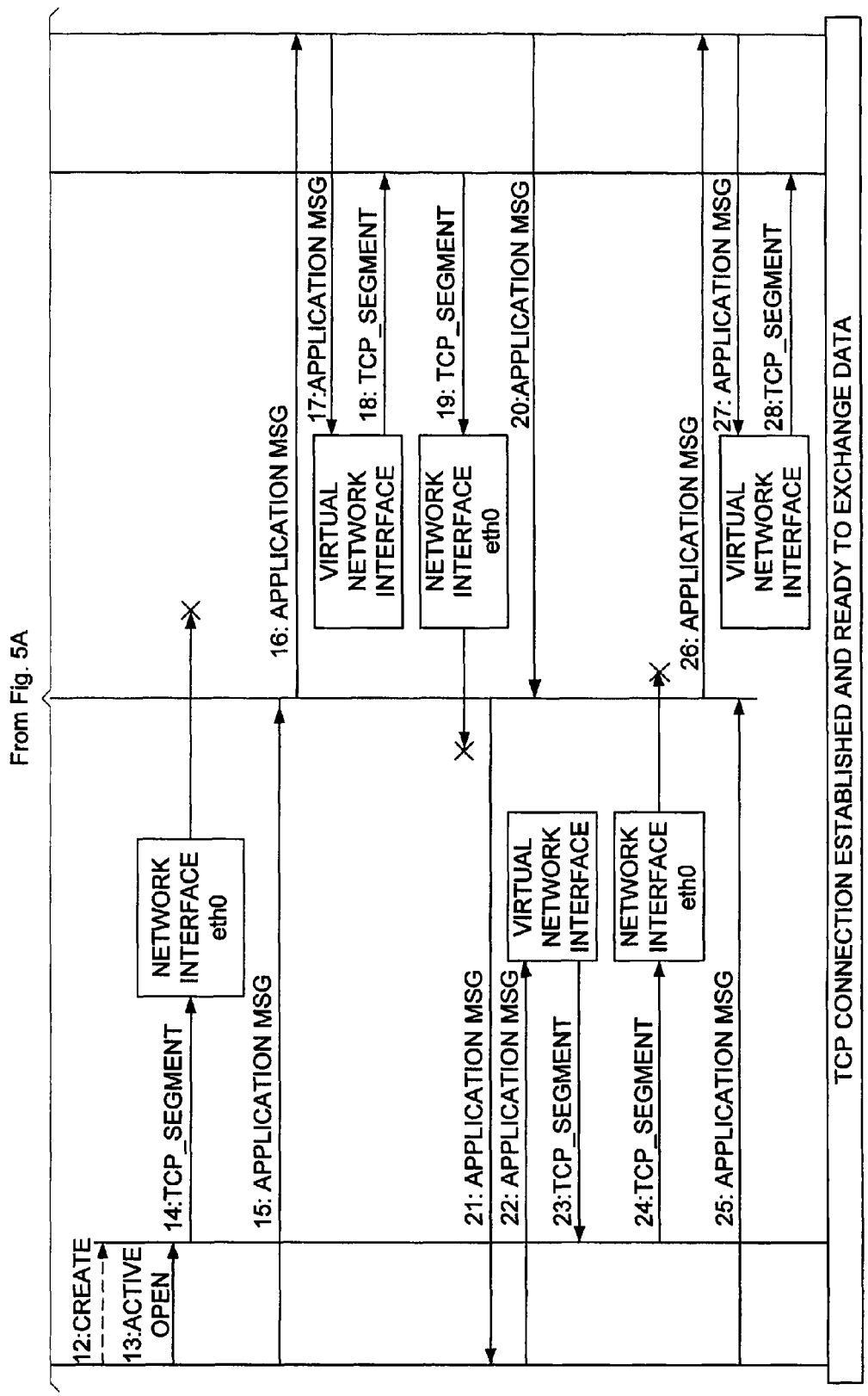

Embodiments of this invention include the execution flow or protocol for TCP connection setup using a control channel, for example in FIG. 5. Using embodiments of this invention, TCP synchronization and connection establishment can be achieved without any modification to the TCP/IP protocol suite using this control channel. A detailed description of the execution 500 is given in the sequence diagram in FIG. 5. This diagram 500 describes how TCP synchronization and connection establishment can be achieved using the system described in embodiments of this invention as follows:

Steps [0-2]: Peer B establishes a standard TCP connection with the signaling broker (SB). This connection is used to pass control messages from Peer B to the SB.

Steps [3-5]: Peer A opens a standard TCP connection with the SB. This connection is used to pass control messages from Peer A to the SB.

Step [8,9]: Peer B opens a TCP socket connection in passive open mode bound to port Y.

Step [12,13]: Peer A opens a TCP socket in active open mode on source port X with destination port Y.

Step [14]: The TCP module creates a TCP segment with the SYN flag set and sequence number of 0. This segment is passed to the lower layers where it is addressed with the Peer B IP address and sent over the network. TCP module at Peer B does not receive this control signal.

Step [15]: The agent application (AA) at Peer A sends an application message containing the TCP parameters of the captured SYN over the control channel to the SB notifying that it has opened a socket in active open mode with Peer B with source port X, destination port Y and sequence number 0.

Step [16]: The SB notifies the AA on Peer B that Peer A opened the socket connection with the parameters source port X, destination port Y and sequence number 0.

Step [17]: The AA on Peer B instructs its virtual network interface and capture module to create a physical layer frame with TCP and IP parameters identical to those that were sent by Peer A.

Step [18]: The virtual network interface and capture module creates the frame and notifies the higher layer protocol that data has been received. The data is passed through the higher layer protocols and to the TCP module at Peer B. The TCP module processes the TCP segment.

Step [19]: The TCP module at Peer B responds to the TCP segment with the SYN flag set by sending a TCP segment with a SYN and ACK flag set to Peer A. The TCP module at Peer A does not receive this control signal.

Step [20]: The AA at Peer B sends an application message containing the TCP parameters of the captured SYN-ACK over the control channel to the SB notifying that it has sent a SYN-ACK.

Step [21]: The SB relays the TCP signaling information to the AA on Peer A.

Step [22]: The AA on Peer A instructs its virtual network interface and capture module to create a physical layer frame with TCP and IP parameters identical to those that were sent by Peer B.

Step [23]: The virtual network interface and capture module creates the frame and notifies the higher layer protocol that data has been received. The data is passed through the higher layer protocols and to the TCP module at Peer A. The TCP module processes the TCP segment.

Step [24]: The TCP module at Peer A responds to the TCP segment with the SYN-ACK flag set by sending a TCP segment with an ACK flag set to Peer B. The TCP module at Peer B does not receive this control signal.

Step [25]: The AA at Peer A sends an application message containing the TCP parameters of the captured ACK over the control channel to the SB notifying that it has sent an ACK.

Step [26]: The SB relays the TCP signaling information to the AA on Peer B.

Step [27]: The AA on Peer B instructs its virtual network interface and capture module to create a physical layer frame with TCP and IP parameters identical to those that were sent by Peer A.

Step [28]: The virtual network interface and capture module creates the frame and notifies the higher layer protocol that data has been received. The data is passed through the higher layer protocols and to the TCP module, which ends the handshaking process and both TCP layers are synchronized and ready to exchange data.

We claim:

1. A method of executing out-of-band signaling for TCP using a control channel to setup and establish a TCP connection between a first TCP endpoint and a second TCP endpoint, comprising the steps of:

establishing the out-of-band control channel for passing a TCP signaling packet between the first TCP endpoint and the second TCP endpoint;

monitoring a TCP/IP suite of the first TCP endpoint for the TCP signaling packet;

capturing the TCP signaling packet at the first TCP endpoint;

sending the TCP signaling packet to the second TCP endpoint via the control channel;

replicating the TCP signaling packet at the second TCP endpoint; and inserting the replicated TCP signaling packet in a TCP/IP suite of the second TCP endpoint.

2. A method of using an out-of-band control channel to establish a TCP connection between a first peer and a second peer, the method comprising the steps of:

providing a first agent application executing on the first peer;

providing a second agent application executing on the second peer;

monitoring an Internet Protocol (IP) operating on a first network layer of the first peer with the first agent application for a TCP control message;

capturing the TCP control message with the first agent application;

sending the TCP control message from the first agent application to the second agent application using an out-of-band control channel;

replicating the TCP control message at the second peer with the second agent application; and inserting the replicated TCP control message in the Internet Protocol operating on a second network layer of the second peer.

3. A system for executing out-of-band signaling for TCP using a control channel to setup and establish a TCP connection, the system comprising:

means for establishing the out-of-band control channel for passing a TCP signaling packet between a first and a second TCP endpoint;

means for monitoring a TCP/IP suite of the first TCP endpoint for the TCP signaling packet;

means for capturing the TCP signaling packet at the first TCP endpoint;

means for sending the TCP signaling packet to the second TCP endpoint via the control channel;

means for replicating the TCP signaling packet at the second TCP endpoint; and means for inserting the replicated TCP signaling packet in a TCP/IP suite of the second TCP endpoint.

* * * * *